Sept. 17, 1946.　　　　A. MARIOTTI　　　　2,407,960
TRANSIT LEVEL
Filed Jan. 5, 1944
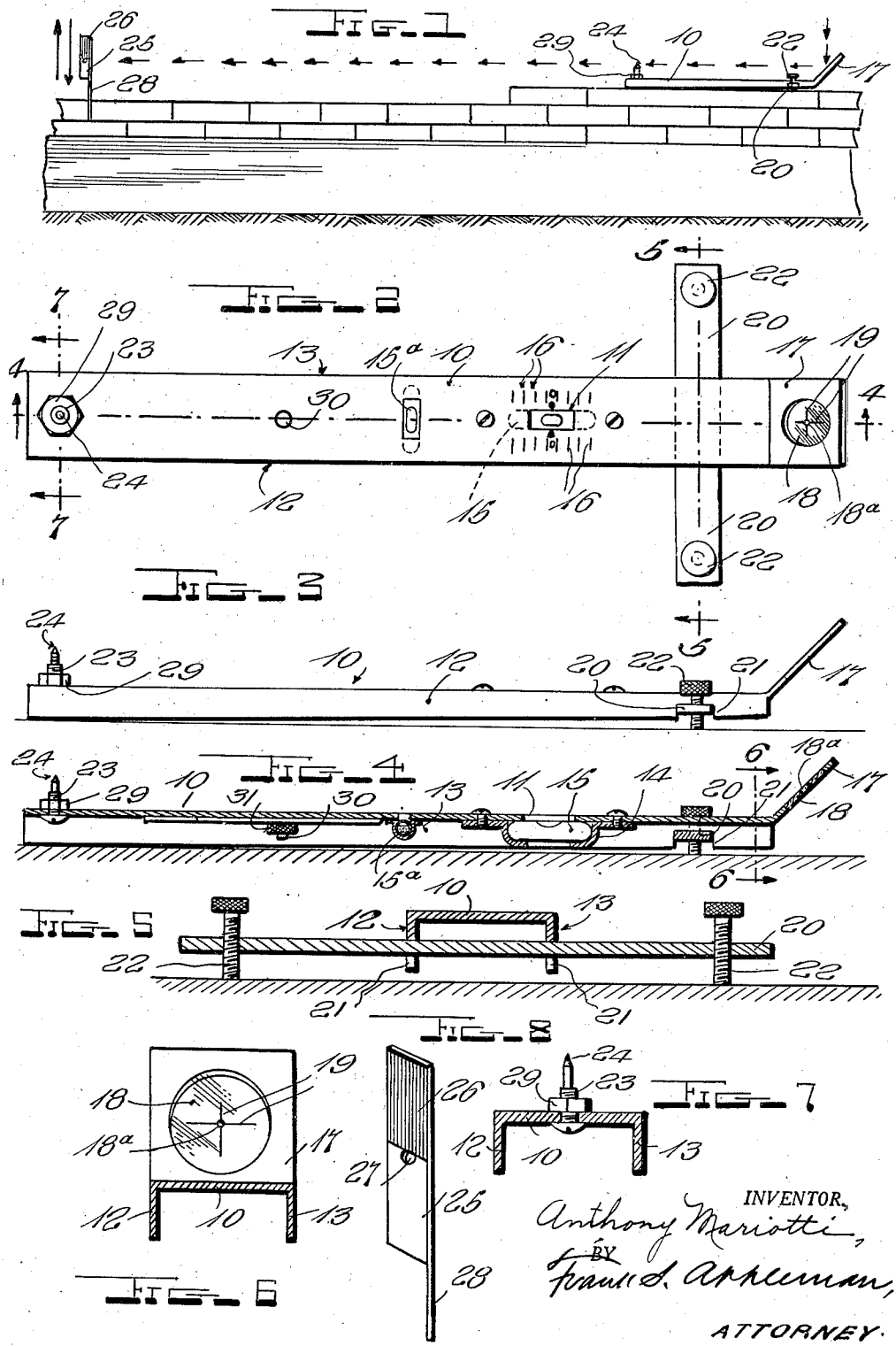
INVENTOR,
Anthony Mariotti,
BY
Frank S. Appleman,
ATTORNEY.

Patented Sept. 17, 1946

2,407,960

UNITED STATES PATENT OFFICE 2,407,960

TRANSIT LEVEL

Anthony Mariotti, Lorain, Ohio

Application January 5, 1944, Serial No. 517,094

1 Claim. (Cl. 88—2.3)

This invention relates to surveying instruments, and particularly to a transit level of a type which is compact in form and can be carried in the pockets of ordinary clothing, making it unnecessary to associate it with a tripod or other cumbersome support.

It is an object of this invention to provide a transit level including a spirit or like level or angle indicator, and it is designed for masons, bricklayers, carpenters, architects, engineers and surveyors, and especially for such as do not have the technical training required for reading complicated surveying instruments and it enables them to operate with efficiency and speed, as well as accuracy.

It is an object of this invention furthermore to provide an instrument by which observations may be made for projecting the line from an obtained level to any distance within the range of vision on that level or any desired angle from that level, and it is of utility in maintaining walls under construction on a true level, and it can be used for staking out lot lines or for any operation which requires a straight line at a definite grade or angle from the horizontal.

A further object of the invention is to provide an instrument of the character indicated comprising comparatively few, inexpensive parts which have proven efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which:

Figure 1 illustrates a view in elevation of the instrument shown applied to courses of brickwork in construction;

Figure 2 illustrates a plan view of the instrument on an enlarged scale;

Figure 3 illustrates a view in side elevation thereof;

Figure 4 illustrates a sectional view on the line 4—4 of Fig. 2;

Figure 5 illustrates a sectional view on the line 5—5 of Fig. 2;

Figure 6 illustrates a sectional view of the instrument on the line 6—6 of Fig. 4;

Figure 7 illustrates a sectional view on the line 7—7 of Fig. 2; and

Figure 8 illustrates a perspective view of a target.

In the illustrated embodiment of the invention, the stock or body 10 is shown as being formed of channel iron with an elongated aperture 11 in the web between the flanges 12 and 13. A housing or guard 14 is secured to the web on its under surface below the aperture 11, and a bulb 15 of a spirit level is located below the aperture within the housing. The upper surface of the web is provided with graduations, as at 16, to indicate any variance from the horizontal position of the stock as the bubble moves due to the inclination of the stock from the horizontal, so that by this means, inclinations or angularities may be figured. One end of the stock has an angularly extending projection 17 having a mirror 18 exposed at its upper face, and the mirror is provided with hair lines 19 which are crossed so that in sighting, the intersection of the lines will be the focal point. A cross arm 20 is located in recesses 21 of the flanges and may be secured in place in any appropriate manner or, under certain conditions, it may be left detachable for the better compact assembly of the instrument in a knockdown state. Supporting or levelling screws 22 are threaded in the arm, one near each end thereof, and may be adjusted for bringing the air bubble into center or for establishing angularity or pitch from the horizontal.

A sighting point is stationed at the end of the stock opposite the mirror and, in the present embodiment of the invention, it comprises a bolt 23 with a sharpened upper end 24 which is sighted from the mirror to a target, for the purposes heretofore indicated. The target in the present embodiment may comprise a plate having surface sections 25 and 26, differently colored, with an aperture 27 at the intersection of the colored areas. The target may also be provided with an anchoring point or rod 28 so that when the proper observations have been made, it may be left stationary for such further use as may be desirable.

The bolt 23 extends through an aperture of the web and is held in place by a nut 29 threaded on it and engages the upper surface of the web.

The point in the rear of mirror 18 is provided with an opening 18a and by fixing the eye on that point (from the rear of the mirror) and finding the point on the bolt 24 at the opposite end of the body 10, a level can be obtained exactly as if the operator were looking in the mirror. This arrangement serves as a double check, in that it provides two methods of sighting the instrument and obtaining a level.

A second bubble 15a is attached to the stock at right angles to the bubble 15 and spaced therefrom. The second bubble 15a may be affixed in a manner similar to that disclosed with reference to bubble 15. This arrangement permits a level to be obtained from the sides of the instrument, in that when both bubbles are in a dead center position, the instrument is not only parallel with the earth but also parallel from either side.

The target when folded or assembled in inoperative position is applied to a threaded stud 30 on the under surface of the web, the aperture 27 receiving the said stud, and a nut 31 threaded on the stud serves to retain the target nested with respect to the stock.

I claim:

A transit level comprising a stock having an upwardly angularly disposed end and carrying a mirror on the upper side thereof, an adjustable sighting point on the stock at the end thereof opposite the mirror and angularly disposed with respect to said stock, whereby said sighting point is reflected in said mirror, a spirit level exposed through the top of the stock, a second sighting point arranged on said mirror, said first and second sighting points being the same distance above the top of the stock whereby the line of sight will be horizontal when said transit level is adjusted to a position in which the spirit level bubble is centered.

ANTHONY MARIOTTI.